US011850483B2

(12) United States Patent
Power et al.

(10) Patent No.: US 11,850,483 B2
(45) Date of Patent: Dec. 26, 2023

(54) METHODS OF JOINING METAL GOLF CLUB COMPONENTS WITH PROJECTION RESISTANCE WELDING

(71) Applicant: Callaway Golf Company, Carlsbad, CA (US)

(72) Inventors: Alex Power, Carlsbad, CA (US); Joshua D. Westrum, Carlsbad, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 92 days.

(21) Appl. No.: 17/558,054

(22) Filed: Dec. 21, 2021

(65) Prior Publication Data

US 2023/0046415 A1 Feb. 16, 2023

Related U.S. Application Data

(60) Provisional application No. 63/232,373, filed on Aug. 12, 2021.

(51) Int. Cl.

| | |
|---|---|
| A63B 53/04 | (2015.01) |
| A63B 53/06 | (2015.01) |
| B23K 10/02 | (2006.01) |
| B23K 37/04 | (2006.01) |
| B23K 103/18 | (2006.01) |
| B23K 103/08 | (2006.01) |

(52) U.S. Cl.
CPC ............ *A63B 53/06* (2013.01); *A63B 53/047* (2013.01); *B23K 10/02* (2013.01); *B23K 37/04* (2013.01); *A63B 2209/00* (2013.01); *B23K 2103/08* (2018.08); *B23K 2103/18* (2018.08)

(58) Field of Classification Search
CPC ........................... A63B 53/04; A63B 53/0416
USPC .................................................. 473/324–350
See application file for complete search history.

(56) References Cited

U.S. PATENT DOCUMENTS

| | | | | |
|---|---|---|---|---|
| 4,768,787 A | * | 9/1988 | Shira | A63B 53/047 473/331 |
| 5,094,383 A | * | 3/1992 | Anderson | A63B 53/0466 164/76.1 |
| 5,344,140 A | * | 9/1994 | Anderson | A63B 60/00 473/342 |
| 5,386,996 A | * | 2/1995 | Hiruta | A63B 60/00 473/346 |
| 5,473,133 A | * | 12/1995 | Peterson | B23K 11/14 219/83 |
| 5,665,014 A | * | 9/1997 | Sanford | A63B 53/0466 473/345 |
| 6,183,377 B1 | * | 2/2001 | Liang | B22D 25/02 164/112 |

(Continued)

FOREIGN PATENT DOCUMENTS

| | | | |
|---|---|---|---|
| DE | 3038909 A1 | * | 5/1982 |
| HU | 186794 | * | 9/1985 |

(Continued)

*Primary Examiner* — Alvin A Hunter
(74) *Attorney, Agent, or Firm* — Michael A. Catania; Rebecca Hanovice; Sonia Lari

(57) ABSTRACT

A method of joining dissimilar metal, golf club components, and particularly golf club bodies, hosels, and faces, using a projection resistance welding process is disclosed herein. The method may include the step of applying an interlayer material before the projection resistance weld process occurs.

17 Claims, 6 Drawing Sheets

(56) References Cited

U.S. PATENT DOCUMENTS

| | | | | |
|---|---|---|---|---|
| 6,749,524 | B1* | 6/2004 | Chen | A63B 53/04 |
| | | | | 473/345 |
| 10,335,653 | B1* | 7/2019 | Daraskavich | B23K 11/315 |
| 2001/0014629 | A1* | 8/2001 | Anderson | A63B 53/04 |
| | | | | 473/345 |
| 2006/0135285 | A1* | 6/2006 | Hou | A63B 53/047 |
| | | | | 473/350 |
| 2006/0138199 | A1* | 6/2006 | Chen | B23K 13/015 |
| | | | | 228/115 |
| 2007/0056938 | A1* | 3/2007 | Chen | B23K 10/02 |
| | | | | 219/121.36 |
| 2007/0099727 | A1* | 5/2007 | Sugimoto | A63B 53/04 |
| | | | | 473/345 |
| 2007/0265107 | A1* | 11/2007 | Wang | B23K 11/002 |
| | | | | 473/332 |
| 2017/0340932 | A1* | 11/2017 | Morales | A63B 60/02 |
| 2018/0209010 | A1* | 7/2018 | Simone | C21D 10/00 |
| 2020/0070017 | A1* | 3/2020 | Aplin | B22F 3/225 |

FOREIGN PATENT DOCUMENTS

| | | | | | |
|---|---|---|---|---|---|
| JP | 52004444 | A | * | 1/1977 | |
| JP | 10151231 | A | * | 6/1998 | ............. A63B 53/04 |
| JP | 3122761 | B2 | * | 1/2001 | ............. G06K 1/125 |
| JP | 2001079120 | A | * | 3/2001 | |
| JP | 2002126134 | A | * | 5/2002 | ............. A63B 53/02 |
| JP | 2003220161 | A | * | 8/2003 | ............. A63B 53/04 |
| JP | 6316064 | B2 | * | 4/2018 | ............... G01J 3/06 |
| JP | 2022120289 | A | * | 8/2022 | ......... A63B 53/0408 |
| TW | 200522998 | A | * | 7/2005 | |
| TW | 576781 | B1 | * | 4/2017 | |
| WO | WO-2006062921 | A2 | * | 6/2006 | ......... A63B 53/0466 |

* cited by examiner

METHODS OF JOINING METAL GOLF CLUB COMPONENTS WITH PROJECTION RESISTANCE WELDING

CROSS REFERENCES TO RELATED APPLICATIONS

The present application claims priority to U.S. Provisional Patent Application No. 63/232,373, filed on Aug. 12, 2021, the disclosure of which is hereby incorporated by reference in its entirety herein.

STATEMENT REGARDING FEDERALLY SPONSORED RESEARCH OR DEVELOPMENT

Not Applicable

BACKGROUND OF THE INVENTION

Field of the Invention

The present invention relates to the use of projection resistance welding to join metal golf club components, and in particular to permanently join golf club faces, hosels, and other key components to golf club bodies made of dissimilar materials.

DESCRIPTION OF THE RELATED ART

The prior art provides several methods for attaching metal golf club components to one another, and in particular golf club faces to golf club bodies. These include tungsten inert gas (TIG) welding, metal inert gas (MIG) welding, laser welding, and plasma welding. One drawback to these methods is that they melt the parent materials. When the joined components are made of different alloys, these melting processes create intermetallic compounds while the parent materials are in liquid state. These intermetallic compounds are weaker (e.g., more brittle) than their parent materials. Therefore, there is a need for improved methods of joining golf components made from dissimilar alloys.

BRIEF SUMMARY OF THE INVENTION

One aspect of the present invention is a method of joining club components made of dissimilar metal materials to one another using projection resistance welding. In particular, projection resistance welding is used to join a golf club face to a golf dub body, a hose to a golf club body, or another component of a golf club to a golf club body and/or face. An interlayer material such as tungsten, molybdenum, niobium, tantalum, vanadium, or zirconium may be used to increase the joint strength to approximate that of the parent materials.

Another aspect of the present invention is a method comprising the steps of preparing a first golf club component comprising a first metal material, preparing a second golf club component comprising a second metal material, and affixing the first golf club component to the second golf club component along a plane via a projection resistance weld joining process. In a further embodiment, the method may comprise the step of applying an interlayer material to at least one of the first golf club component and the second golf club component if the first metal material is different from the second metal material. In a further embodiment, this step of applying an interlayer material may occur before the step of affixing the first golf club component to the second golf club component. In these embodiments, the interlayer material may be selected from the group consisting of tungsten, molybdenum, niobium, tantalum, vanadium, and zirconium.

In some embodiments, the first metal material may be selected from the group consisting of 17-4 stainless steel, 304 stainless steel, 304L stainless steel, 321 stainless steel, 303 stainless steel, 316 stainless steel, 316L stainless steel, 420 stainless steel, 425 stainless steel, 425M stainless steel, 450 stainless steel, 455 stainless steel, 475 stainless steel, and HSR300 stainless steel, and the second metal material may not be a stainless-steel material. In other embodiments, the first metal material may be selected from the group consisting of 6061 aluminum, 6063 aluminum, and 7075 aluminum, and the second metal material may not be an aluminum material. In still other embodiments, the first metal material may be selected from the group consisting of 6-4 titanium, 811 titanium, FS2S titanium, FS2S+ titanium, SP700 titanium, Ti 17, Ti 21, and 15-3-3-3 titanium, and the second metal material may not be a titanium material. In yet other embodiments, the first metal material may be selected from the group consisting of C300 maraging steel, 1020 steel, 1025 steel, 1045 steel, 4130 steel, 4140 steel, and 4340 steel, and the second metal material may not be a steel material. In another embodiment, the first metal material may be a tungsten alloy having a density of 10 g/cc to 18 g/cc, and the second metal material may not be not a tungsten alloy.

In any of the embodiments, the first golf club component may be selected from the group consisting of a weight component, a secondary variable face thickness component, a stiffening component, and a strengthening component, and the second golf club component may be a face component, which may be selected from the group consisting of a face insert, a face plate, and a face cup. In another embodiment, the golf club component may be selected from the group consisting of a weight component, a stiffening component, and a strengthening component, and the second golf club component may be a body component selected from the group consisting of a hollow body, a solid body, and a body having at least one cavity. In a further embodiment, the body may be composed of at least one piece. In any embodiment, the first golf club component may be a hosel component and the second golf club component may be a body.

Yet another aspect of the present invention is a method comprising the steps of providing a golf club body with a first planar joining surface, providing a golf club face component with a second planar joining surface, and affixing the first planar joining surface to the second planar joining surface via a projection resistance welding process, wherein the golf club body is composed of a first metal alloy, and wherein the golf club face component is composed of a second metal alloy that is different from the first metal alloy. In a further embodiment, the method may comprise the step of applying an interlayer material between the first planar joining surface and the second planar joining surface, which interlayer material may be composed of a third metal alloy that is different from the first metal alloy and the second metal alloy. In a further embodiment, the interlayer material may be selected from the group consisting of tungsten, molybdenum, niobium, tantalum, vanadium, and zirconium.

In some embodiments, the golf club body may be an iron-type golf club body, and the golf club face component may be a face cup. In other embodiments, the golf club body may be a hybrid or a fairway wood type body. In still other embodiments, the first metal alloy may be selected from the group consisting of 17-4 stainless steel, 304 stainless steel, 304L stainless steel, 321 stainless steel, 303 stainless steel, 316 stainless steel, 316L stainless steel, 420 stainless steel, 425 stainless steel, 425M stainless steel, 450 stainless steel, 455 stainless steel, 475 stainless steel, and HSR300 stainless steel, and the second metal alloy may not be a stainless steel material. In another embodiment, the first metal alloy may be selected from the group consisting of 6061 aluminum, 6063 aluminum, and 7075 aluminum, and the second metal alloy may not be an aluminum material. In yet another embodiment, the first metal alloy may be selected from the group consisting of 6-4 titanium, 811 titanium, FS2S titanium, FS2S+ titanium, SP700 titanium, Ti 17, Ti 21, and 15-3-3-3 titanium, and the second metal alloy may not be a titanium material. In still another embodiment, the first metal alloy may be selected from the group consisting of C300 maraging steel, 1020 steel, 1025 steel, 1045 steel, 4130 steel, 4140 steel, and 4340 steel, and the second metal alloy may not be a steel material. In yet another embodiment, the first metal alloy may be a tungsten alloy having a density of 10 g/cc to 18 g/cc, and the second metal alloy may not be a tungsten alloy.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention is a method 100 of affixing golf club components made of dissimilar metals to one another using one projection resistance welding. Projection resistance welding is a near-solid state joining process that barely liquefies the mating surfaces of the components with and without use of an interlayer 40, which is used in cases— where components are made from dissimilar materials that form intermetallic compounds when exposed to elevated temperatures during typical joining processes (e.g., TIG welding, MIG welding, laser welding, plasma welding, etc.). If an interlayer 40 is used, it is preferably tungsten, molybdenum, niobium, tantalum, vanadium, or zirconium, which can increase the joint strength to approximate that of the parent materials.

Combinations of dissimilar metal materials include, for example, stainless steel to titanium, steel to titanium, stainless steel to aluminum, steel to aluminum, aluminum to titanium, tungsten to titanium, tungsten to stainless steel, and tungsten to steel. In these combinations, the stainless steel may be 17-4, 304, 304L, 321, 303, 316, 316L, 420, 425, 425M, 450, 455, 475, or HSR300, the aluminum may be 6061, 6063, or 7075, the titanium may be 6-4, 811, FS2S, FS2S+, SP700, Ti 17, Ti 21, 15-3-3-3, the steel may be C300 maraging steel, 1020, 1025, 1045, 4130, 4140, 4340, and the tungsten may have a density of 10 g/cc to 18 g/cc.

Figure 8:
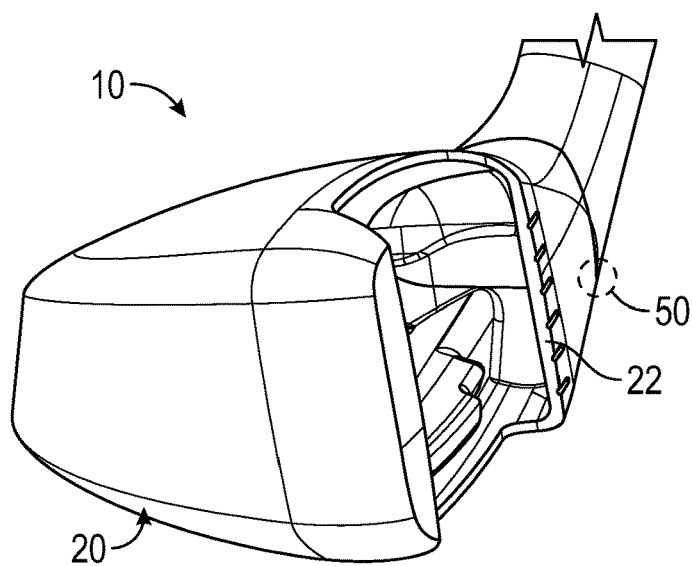
FIG. 8 is a side perspective view of a second golf club head manufactured using methods of the present invention with its face component removed.
Figure 9:
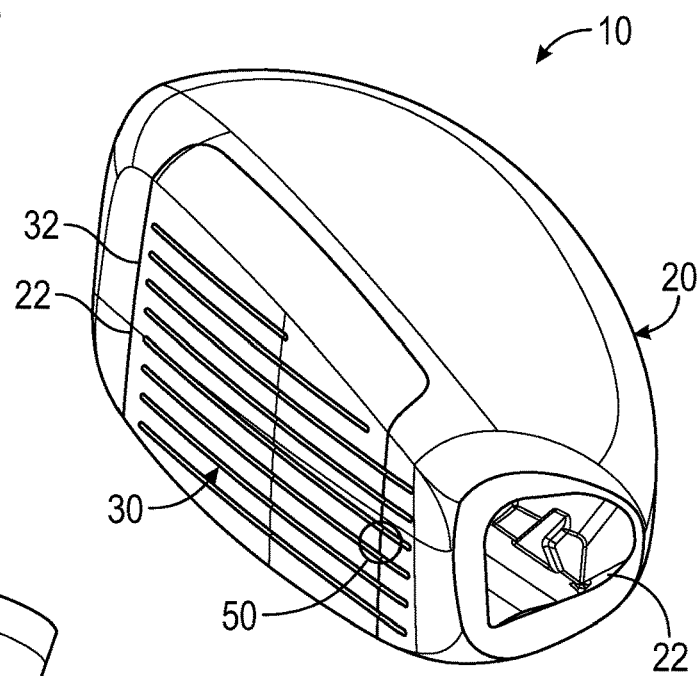
FIG. 9 is another side perspective view of the embodiment shown in FIG. 8 with its hosel component removed.
Figure 10:
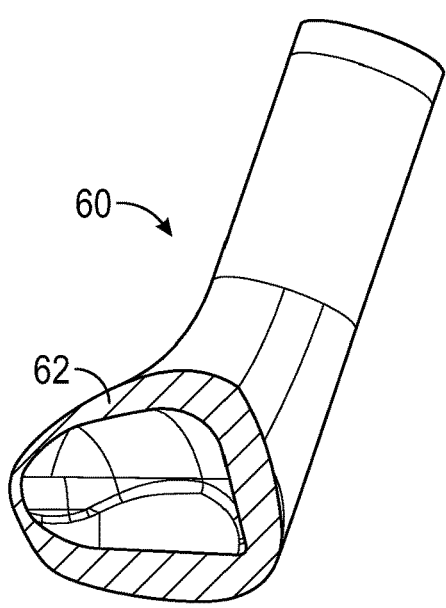
FIG. 10 is a side perspective view of the hosel component shown in FIG. 8.
Figure 11:
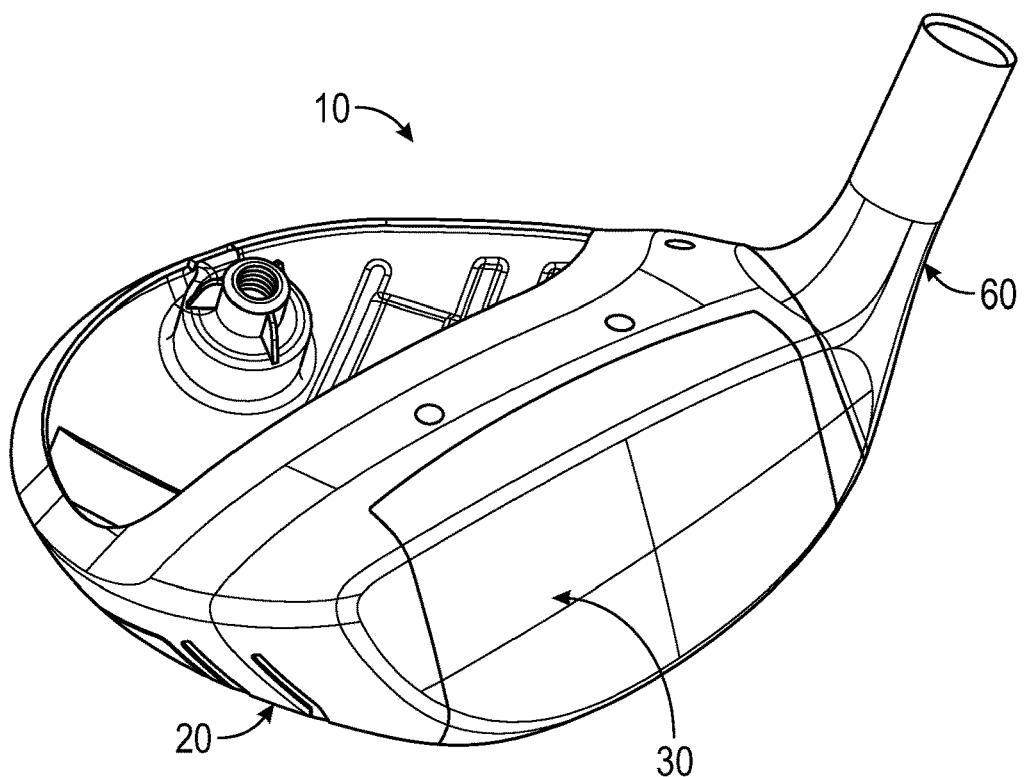
FIG. 11 is a top perspective view of a third golf club head manufactured using methods of the present invention with its crown component removed.
Figure 12:
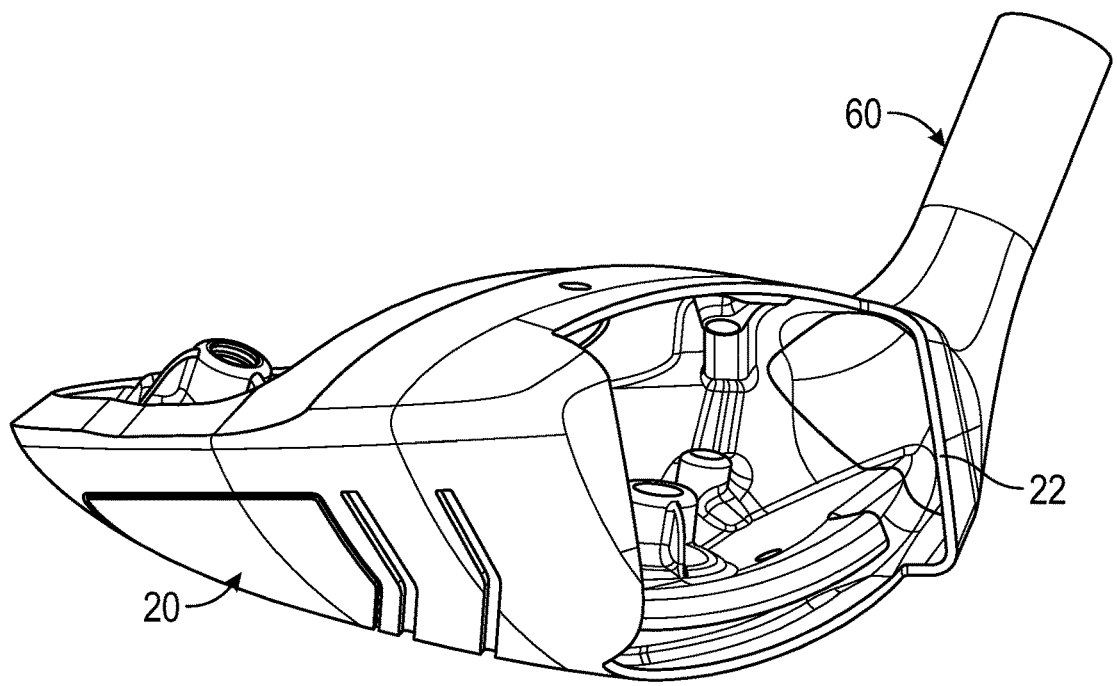
FIG. 12 is a side perspective view of the embodiment shown in FIG. 11 with its face component removed.
Figure 13:
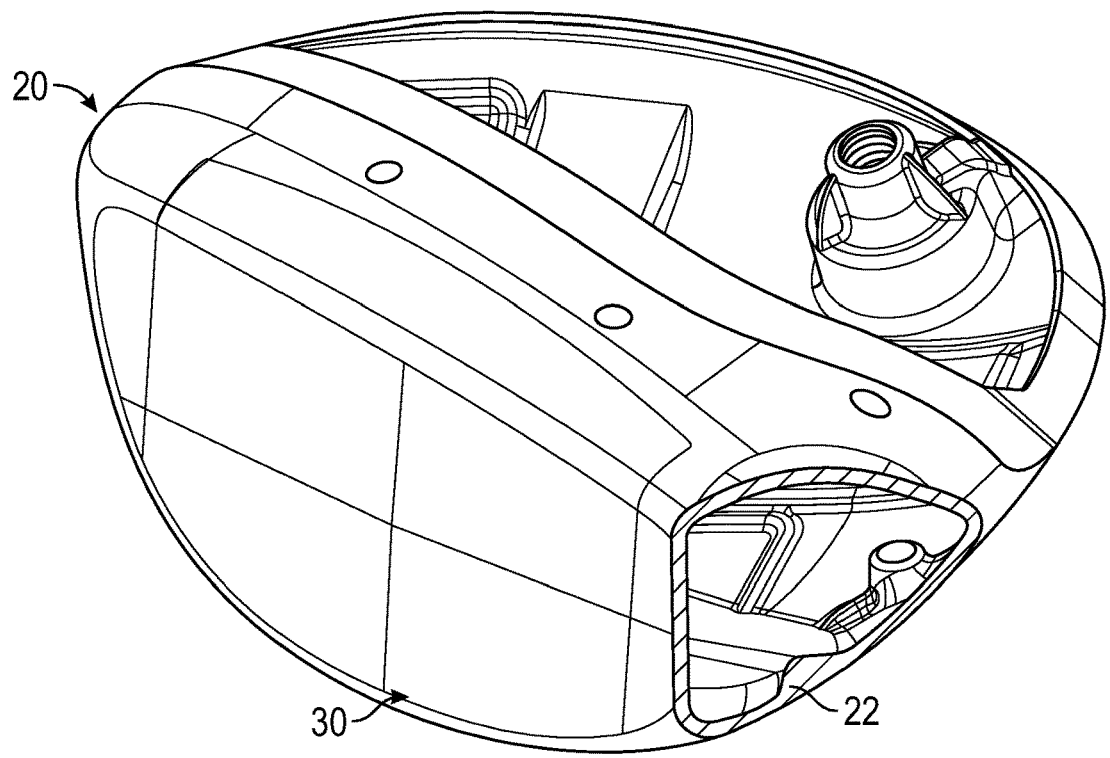
FIG. 13 is another side perspective view of the embodiment shown in FIG. 11 with its hosel component removed.
Figure 14:
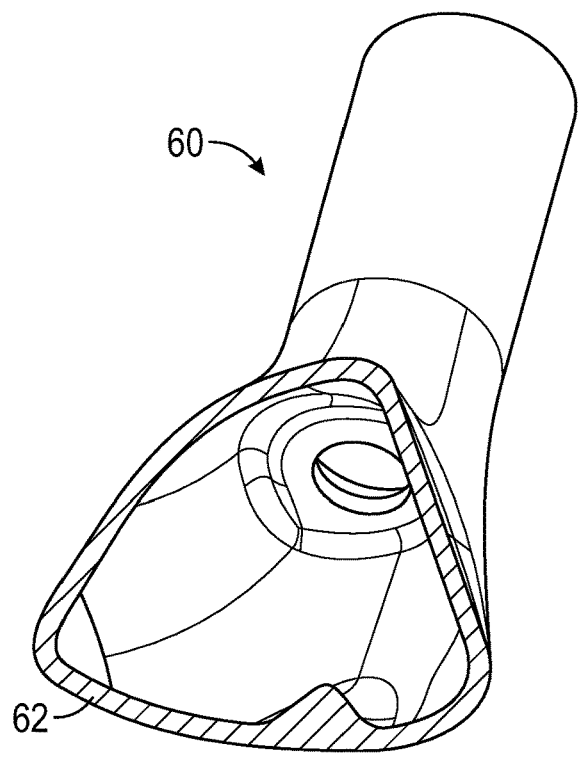
FIG. 14 is a side perspective view of the hosel component shown in FIGS. 11-12.

In a preferred embodiment, this method 100 is used to affix a first component, which may be a body component 20, to a second component, such as a face component 30, to create, for example, the iron-type golf club head 10 shown in FIGS. 1-6, though in other embodiments the components may be for other types of golf club heads, such as drivers, hybrids (as shown in FIGS. 8-10), fairway woods (as shown in FIGS. 11-14), wedges, and putters. In still other embodiments, the method 100 described herein may be used to join a hosel component to a body component 20, a weight component to a body component 20 or a face component a secondary variable face thickness component to a face component 30, a different density material to the face component 30 or body component 20, a stiffening component to the face component 30 or body component 20, or a strengthening component to the face component 30 or body component 20. In any embodiment, the face component 30 may be a face insert, face plate, or a face cup, the body component 20 may be a hollow body, open cavity body, or solid body, and the body component 20 may be made of one or more pieces.

Figure 1:
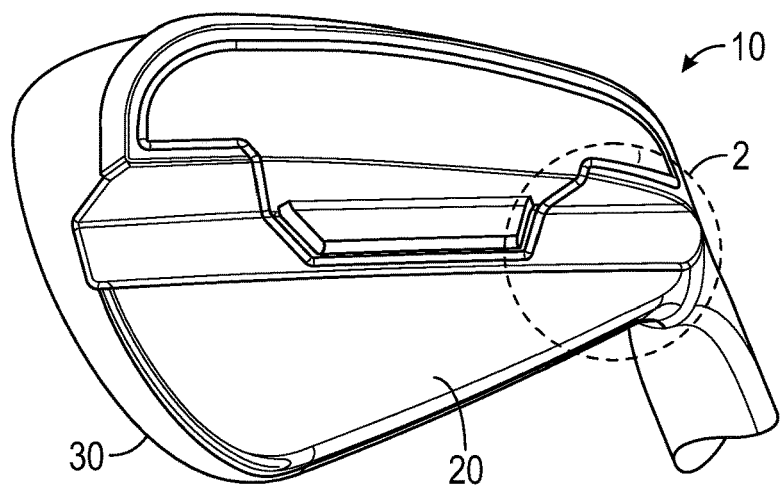
FIG. 1 is a rear perspective view of a first golf club head manufactured using methods of the present invention.
Figure 2:
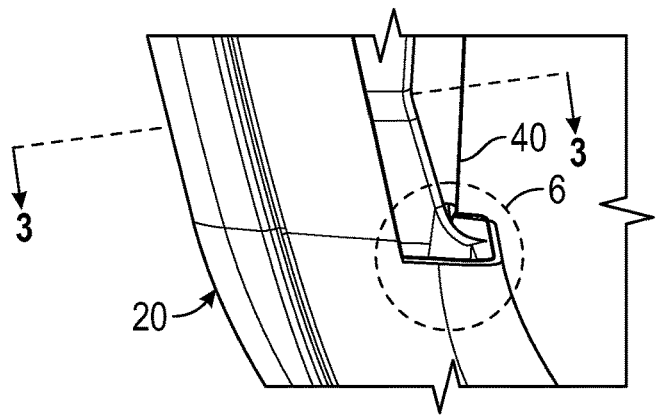
FIG. 2 is a sole view of the circled portion of the embodiment shown in FIG. 1 without the face component.
Figure 3:
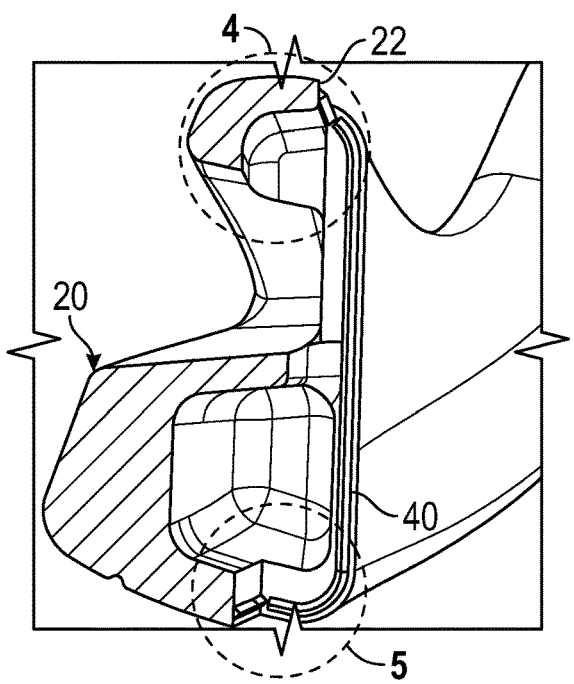
FIG. 3 is a cross-sectional view of the embodiment shown in FIG. 2 taken along lines 3-3.
Figure 4:
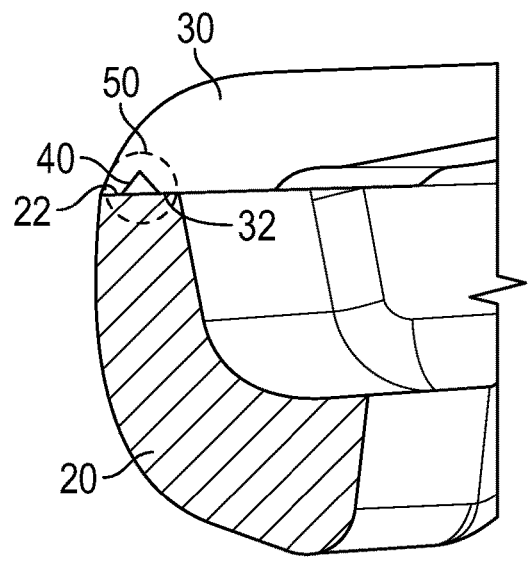
FIG. 4 is an enlarged view of the circled portion of the embodiment shown in FIG. 3 engaged with a face component.
Figure 5:
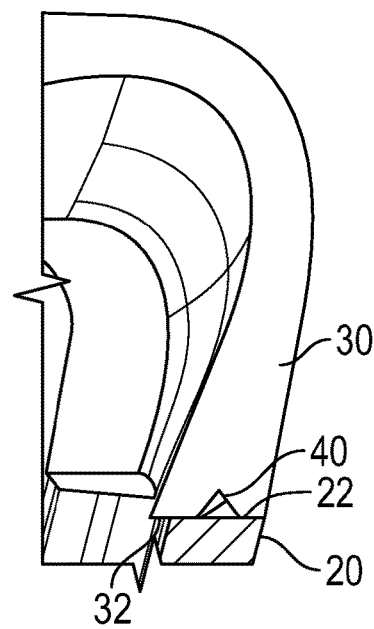
FIG. 5 is an enlarged view of the circled portion of the embodiment shown in FIG. 3 engaged with a face component.
Figure 6:
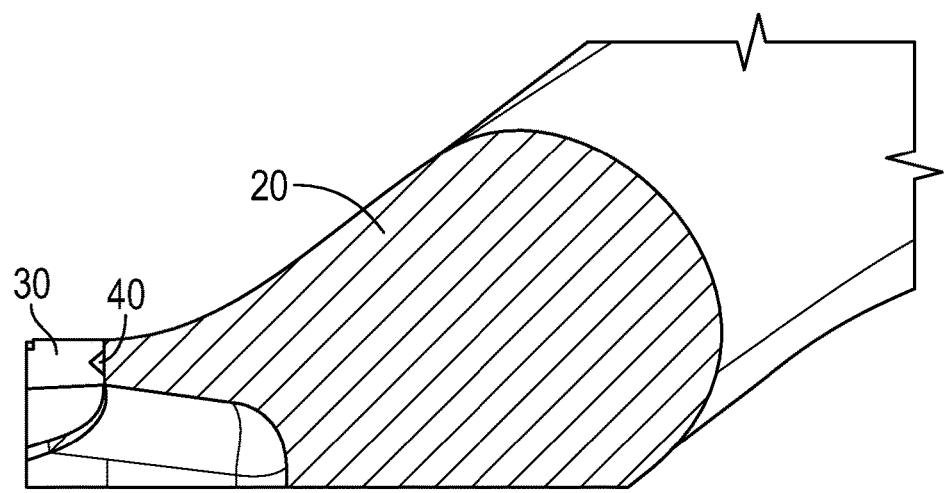
FIG. 6 is an enlarged view of the circled portion of the embodiment shown in FIG. 2 engaged with a face component.
Figure 7:
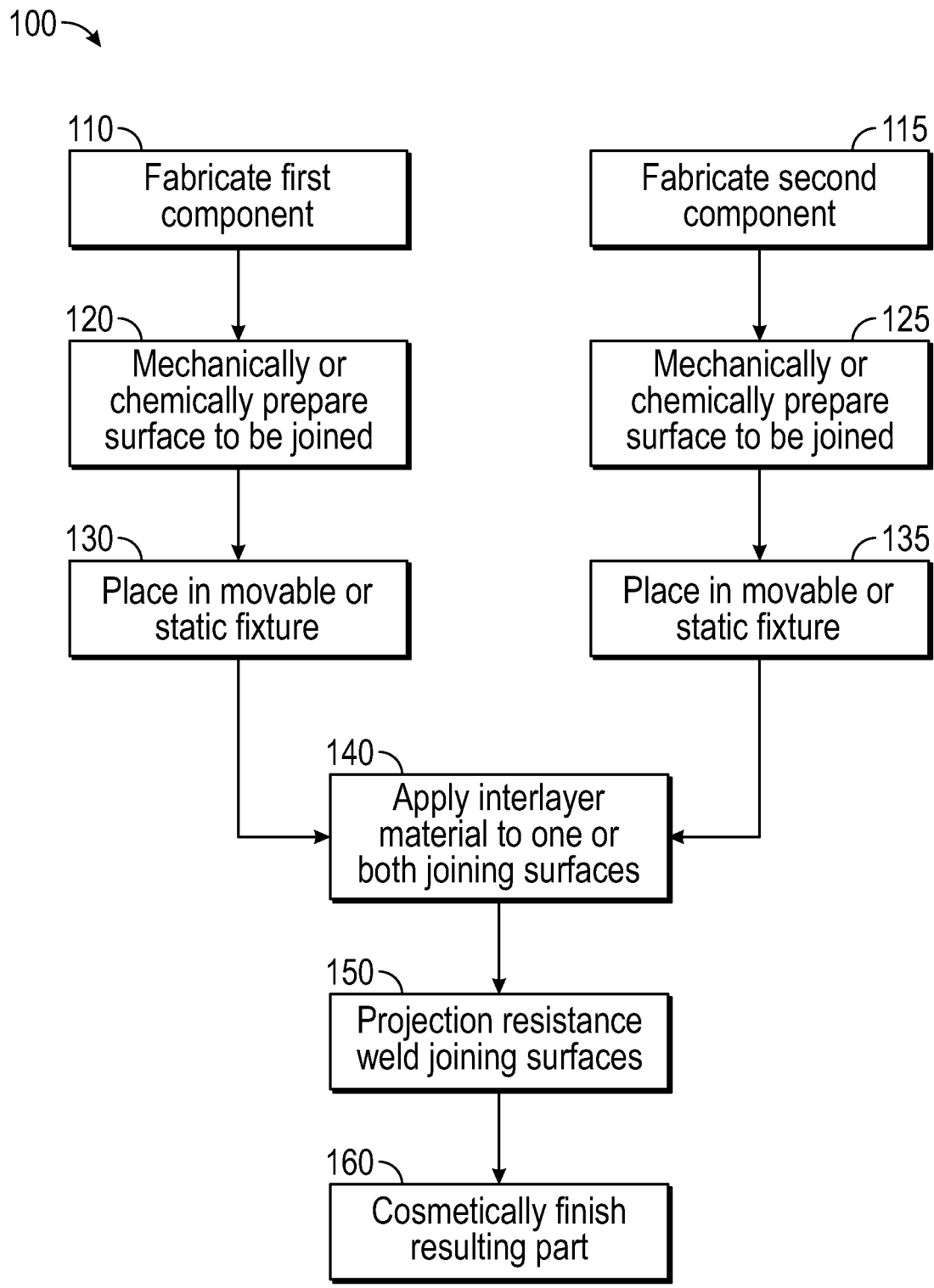
FIG. 7 is a process flow chart describing a method of the present invention.

As illustrated in FIG. 7, the first step 110 of the method 100 comprises fabricating a first component (such as the body component 20) and the second step 115 comprises fabricating a second component (such as the face component 30 and/or hosel component 60). These steps 110, 115 may be performed simultaneously using any method known to a person skilled in the art. In third and fourth steps 120, 125, joining surfaces 22, 32, 62 of the first and second components (e.g., body and face components 20, 30 and/or body and hosel components 20, 60) are mechanically or chemically prepared for the joining process, and in fifth and sixth steps 130, 135, the first and second components (e.g., body and face components 30 and/or body and hosel components 20, 60) are placed in one or more fixtures, which may be movable or static. In a seventh step 140, which is optional unless the components are made from dissimilar materials, an interlayer material 40 is applied to one or both of the joining surfaces 22, 32, 62 and in an eighth step 150, the joining surfaces 22, 32, 62 are affixed to one another using a projection resistance welding process to create a combination part with a bond at the joint 50. In a final, ninth step 160, the combination part is cosmetically finished.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications, combinations, and substitutions of equivalents may be made therein without departing from the spirit and scope of this invention which is intended to be unlimited by the foregoing except as may appear in the following appended claims. The section titles included herein also are not intended to be limiting. Therefore, the embodiments of the invention in which an exclusive property or privilege is claimed are defined in the following appended claims.

We claim:

1. A method comprising the steps of:
   preparing a first golf club component comprising a first metal material;
   preparing a second golf club component comprising a second metal material;
   applying an interlayer material to at least one of the first golf club component and the second golf club component, wherein the first metal material is different from the second metal material; and
   affixing the first golf club component to the second golf club component along a plane via a projection resistance weld joining process.

2. The method of claim 1, wherein the interlayer material is selected from the group consisting of tungsten, molybdenum, niobium, tantalum, vanadium, and zirconium.

3. The method of claim 1, wherein the first metal material is selected from the group consisting of 17-4 stainless steel, 304 stainless steel, 304L stainless steel, 321 stainless steel, 303 stainless steel, 316 stainless steel, 316L stainless steel, 420 stainless steel, 425 stainless steel, 425M stainless steel, 450 stainless steel, 455 stainless steel, 475 stainless steel, and HSR300 stainless steel, and wherein the second metal material is not a stainless steel material.

4. The method of claim 1, wherein the first metal material is selected from the group consisting of 6061 aluminum, 6063 aluminum, and 7075 aluminum, and wherein the second metal material is not an aluminum material.

5. The method of claim 1, wherein the first metal material is selected from the group consisting of 6-4 titanium, 811 titanium, FS2S titanium, FS2S+ titanium, SP700 titanium, Ti 17, Ti 21, and 15-3-3-3 titanium, and wherein the second metal material is not a titanium material.

6. The method of claim 1, wherein the first metal material is selected from the group consisting of C300 maraging steel, 1020 steel, 1025 steel, 1045 steel, 4130 steel, 4140 steel, and 4340 steel, and wherein the second metal material is not a steel material.

7. The method of claim 1, wherein the first metal material is a tungsten alloy having a density of 10 g/cc to 18 g/cc, and wherein the second metal material is not a tungsten alloy.

8. The method of claim 1, wherein the first golf club component is selected from the group consisting of a weight component, a stiffening component, and a strengthening component, and wherein the second golf club component is a body component.

9. The method of claim 8, wherein the body component is selected from the group consisting of a hollow body, a solid body, and a body having at least one cavity.

10. The method of claim 9, wherein the body is composed of at least one piece.

11. The method of claim 1, wherein the first golf club component is a hosel component, and wherein the second golf club component is a body component.

12. The method of claim 1, A method comprising the steps of:
    preparing a first golf club component comprising a first metal material;
    preparing a second golf club component comprising a second metal material;
    affixing the first golf club component to the second golf club component along a plane via a projection resistance weld joining process;
    wherein the first golf club component is selected from the group consisting of a weight component, a secondary variable face thickness component, a stiffening component, and a strengthening component, and wherein the second golf club component is a face component.

13. The method of claim 12, wherein the face component is selected from the group consisting of a face insert, a face plate, and a face cup.

14. A method comprising the steps of:
    providing a golf club body with a first planar joining surface;
    providing a golf club face component with a second planar joining surface;
    applying an interlayer material between the first planar joining surface and the second planar joining surface, and wherein the interlayer material is composed of a third metal alloy that is different from the first metal alloy and the second metal alloy; and
    affixing the first planar joining surface to the second planar joining surface via a projection resistance welding process,
    wherein the golf club body is composed of a first metal alloy, and
    wherein the golf club face component is composed of a second metal alloy that is different from the first metal alloy.

15. The method of claim 14, wherein the interlayer material is selected from the group consisting of tungsten, molybdenum, niobium, tantalum, vanadium, and zirconium.

16. The method of claim 14, wherein the first metal alloy is selected from the group consisting of 17-4 stainless steel, 304 stainless steel, 304L stainless steel, 321 stainless steel, 303 stainless steel, 316 stainless steel, 316L stainless steel, 420 stainless steel, 425 stainless steel, 425M stainless steel, 450 stainless steel, 455 stainless steel, 475 stainless steel, and HSR300 stainless steel, and wherein the second metal alloy is not a stainless steel material.

17. The method of claim 14, wherein the first metal alloy is selected from the group consisting of 6061 aluminum, 6063 aluminum, and 7075 aluminum, and wherein the second metal alloy is not an aluminum material.

* * * * *